United States Patent
Li et al.

(10) Patent No.: US 11,339,322 B2
(45) Date of Patent: *May 24, 2022

(54) CROSS-LINKED ACRYLAMIDE POLYMER OR COPOLYMER GEL AND BREAKER COMPOSITIONS AND METHODS OF USE

(71) Applicant: Kemira Oyj, Helsinki (FI)

(72) Inventors: Jiang Li, Johns Creek, GA (US); Roopa Tellakula, Suwanee, GA (US); Scott Rosencrance, Douglasville, GA (US)

(73) Assignee: KEMIRA OYJ, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/102,434

(22) PCT Filed: Dec. 30, 2014

(86) PCT No.: PCT/US2014/072668
§ 371 (c)(1),
(2) Date: Jun. 7, 2016

(87) PCT Pub. No.: WO2015/103203
PCT Pub. Date: Jul. 9, 2015

(65) Prior Publication Data
US 2016/0376494 A1  Dec. 29, 2016

Related U.S. Application Data

(60) Provisional application No. 61/922,517, filed on Dec. 31, 2013.

(51) Int. Cl.
*C09K 8/68* (2006.01)
*C09K 8/88* (2006.01)
(Continued)

(52) U.S. Cl.
CPC .............. *C09K 8/685* (2013.01); *C09K 8/887* (2013.01); *E21B 43/26* (2013.01); *E21B 43/267* (2013.01);
(Continued)

(58) Field of Classification Search
CPC .... C09K 2208/26; C09K 8/685; C09K 6/887; E21B 43/26; E21B 43/267
See application file for complete search history.

(56) References Cited

U.S. PATENT DOCUMENTS 4,103,742 A * 8/1978 Swanson ................... C09K 8/76
166/282
4,155,405 A  5/1979 Vio
(Continued)

OTHER PUBLICATIONS

International Search Report for PCT Patent Application No. PCT/US2014/072668, dated Mar. 9, 2015.

*Primary Examiner* — Angela M DiTrani Leff
(74) *Attorney, Agent, or Firm* — Eversheds Sutherland (US) LLP

(57) ABSTRACT

Well treatment fluids, and methods for treating wellbores or fracturing subterranean formations, which include acrylamide polymer or copolymer crosslinked with one or more crosslinkers and one or more iron-containing compounds are provided. The fluids and methods may be used to carry proppants into fractures and to increase fluid recovery in hydraulic fracturing applications

17 Claims, 3 Drawing Sheets

(51) Int. Cl.
*E21B 43/26* (2006.01)
*E21B 43/267* (2006.01)

(52) U.S. Cl.
CPC ...... *C09K 2208/24* (2013.01); *C09K 2208/26* (2013.01)

(56) References Cited

U.S. PATENT DOCUMENTS

| | | | | |
|---|---|---|---|---|
| 5,143,157 | A | * | 9/1992 | Harms ................... C09K 8/685 166/300 |
| 5,358,043 | A | * | 10/1994 | Moradi-Araghi ...... C09K 8/887 166/270 |
| 7,159,658 | B2 | * | 1/2007 | Frost ....................... C09K 8/845 166/300 |
| 9,920,241 | B2 | * | 3/2018 | Li ........................... C09K 8/80 |
| 10,689,565 | B2 | * | 6/2020 | Li ........................... C09K 8/882 |
| 2005/0061502 | A1 | | 3/2005 | Hanes et al. |
| 2008/0099207 | A1 | * | 5/2008 | Venditto ................. C09K 8/52 166/308.3 |
| 2015/0175880 | A1 | * | 6/2015 | Parris ..................... C09K 8/032 166/308.2 |
| 2016/0122625 | A1 | * | 5/2016 | Singh ..................... C09K 8/706 166/307 |

* cited by examiner

CROSS-LINKED ACRYLAMIDE POLYMER OR COPOLYMER GEL AND BREAKER COMPOSITIONS AND METHODS OF USE

CROSS-REFERENCE TO RELATED APPLICATION

This application is a national stage application under 35 U.S.C. § 371 of International Application No. PCT/US2014/072668, filed Dec. 30, 2014, which claims priority to U.S. Provisional Patent Application No. 61/922,517, filed Dec 31, 2013, each of which are incorporated herein by reference in their entirety.

FIELD OF THE ART

The present disclosure generally relates to compositions and well treatment fluids for use in hydraulic fracturing applications.

BACKGROUND

In the drilling, completion, and stimulation of oil and gas wells, well treatment fluids are often pumped into well bore holes under high pressure and at high flow rates causing the rock formation surrounding the well bore to fracture. A type of well treatment commonly utilized for stimulating hydrocarbon production from a subterranean zone penetrated by a well bore is hydraulic fracturing. Hydraulic fracturing, also referred to as fracing (or fracking), is used to initiate production in low-permeability reservoirs and re-stimulate production in older producing wells. In hydraulic fracing, a fluid composition is injected into the well at pressures effective to cause fractures in the surrounding rock formation. Fracing is used both to open up fractures already present in the formation and create new fractures.

Proppants, such as sand and ceramics, are used to keep induced fractures open both during and after a fracturing treatment. To place the proppants inside the fracture, the proppant particles are suspended in a fluid that is pumped into the subterranean formation. Generally, this fluid has a viscosity sufficient to maintain suspension of the particles.

For ideal performance, a hydraulic fracturing fluid should be sufficiently viscous to create a fracture of adequate width and be able to transport large quantities of proppants into the fracture. Rheology modifiers (thickeners or viscosifiers), may be used in these fluids to increase the viscosity. The viscosity of the fluid can be enhanced or modified by addition of synthetic and/or natural polymers. Examples of polymer-enhanced fluids include slickwater systems, linear gel systems, and crosslinked gel systems.

A crosslinked gel system is a more viscous type of hydraulic fracturing fluid used for transporting of proppant. In crosslinked gel systems, a linear polymer or gel, for example, a fluid based on guar or modified guar, is cross-linked with added reagents such as borate, zirconate, and titanate in the presence of alkali. The most common version of crosslinked gel is known in the art as guar-borate gel. Upon crosslinking of the linear polymer into a crosslinked gel fluid, the viscosity of the fluid increases and proppants can be effectively suspended.

Once the hydraulic fracturing fluid has delivered proppant to the fracture or delivered sand in gravel packing or frac packing operations, it is often desirable to lower the viscosity of the fracturing fluid such that the fluid can be recovered from the formation using minimal energy. The removal of the spent fracturing fluids from the subterranean formation is typically required to allow hydrocarbon production. This reduction in viscosity of the fracturing fluid is often achieved using a breaker that breaks the cross-linking bonds of the crosslinked gels.

Synthetic polymers, for example polyacrylamide (PAM) polymers, can form permanent gel under acidic conditions with metal crosslinking agents, such as aluminum-, chromium-, zirconium- and titanium-based complexes. Such gels can be used, for example, to control conformance in enhanced oil recovery (EOR) applications, where subsequent breaking to significantly reduce viscosity is not necessary. However, for fracing fluid applications, the acidity of the formation in hydraulic fracturing is usually not high, and breaking of the crosslinked gel improves fluid recovery.

SUMMARY

Disclosed herein are well treatment fluids comprising: a first composition comprising monomers of an acrylamide polymer or copolymer or an aqueous dispersion or emulsion of an acrylamide polymer or copolymer; a second composition comprising one or more crosslinkers; and a breaker composition comprising one or more iron-containing compounds. Also disclosed herein are well treatment fluids comprising a gel composition and a breaker composition comprising one or more iron-containing compounds; wherein the gel composition comprises an acrylamide polymer or copolymer crosslinked with one or more crosslinkers. Methods of treating a wellbore, or of fracturing a subterranean formation, with the well treatment fluid, are also provided. Methods of treating a wellbore, or of fracturing a subterranean formation, comprise injecting into a wellbore: a first composition comprising monomers of an acrylamide polymer or copolymer or an aqueous dispersion or emulsion of an acrylamide polymer or copolymer; a second composition comprising one or more crosslinkers; and a breaker composition comprising one or more iron-containing compounds. A method of treating a wellbore, or of fracturing a subterranean formation, comprises injecting into a wellbore a gel composition and a breaker composition comprising one or more iron-containing compounds; wherein the gel composition comprises an acrylamide polymer or copolymer crosslinked with one or more crosslinkers.

The disclosure may be understood more readily by reference to the following detailed description of the various features of the disclosure and the examples included therein.

DETAILED DESCRIPTION

Figure 1:
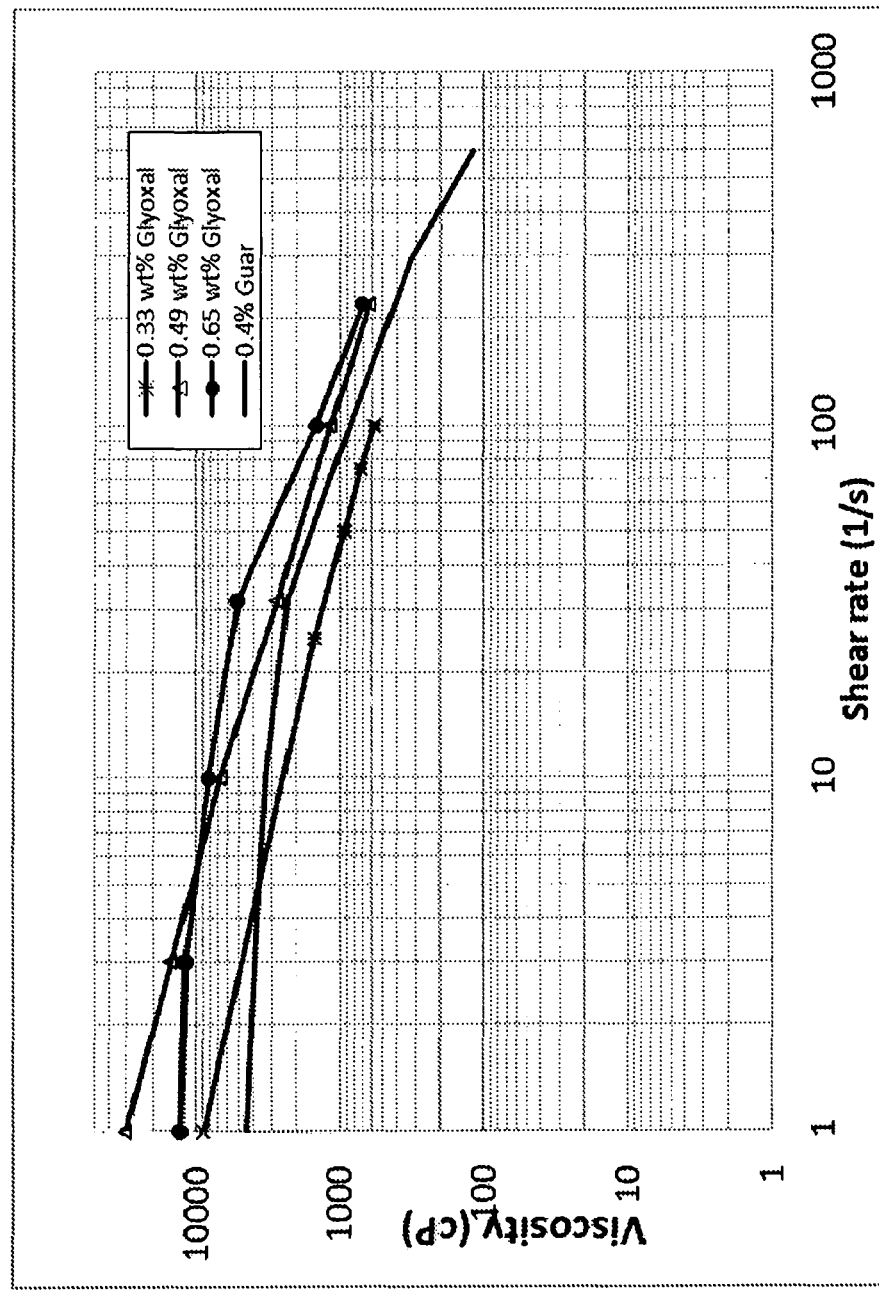
FIG. 1 shows the results of the viscosity analyses for exemplary gels according to the embodiments and a guar gel.

The present disclosure provides certain well treatment fluids and methods of treating a wellbore, or fracturing a subterranean formation. The fluids and methods, which involve acrylamide polymers or copolymers crosslinked with certain crosslinkers, and breaker compositions comprising one or more iron-containing compounds, are for use in hydraulic fracturing applications. In particular, the fluids and methods may be used to carry proppants into fractures and to increase fluid recovery in hydraulic fracturing applications. The exemplary fluids and methods may be used to facilitate the replacement of crosslinked guar in hydraulic fracturing applications with comparable or improved performance.

Polymer and Gel Compositions

In exemplary embodiments, a composition comprises an acrylamide polymer or copolymer crosslinked with one or more crosslinkers. In exemplary embodiments, the composition is a gel composition. In exemplary embodiments, the gel composition is formed by combining the monomers of the acrylamide polymer or copolymer and the one or more crosslinkers. In exemplary embodiments, the gel composition is formed by combining an aqueous dispersion or emulsion of the acrylamide polymer or copolymer and the one or more crosslinkers. In exemplary embodiments, the monomers of the acrylamide polymer or copolymer may be provided as a composition comprising monomers of the acrylamide polymer or copolymer. In exemplary embodiments, the aqueous dispersion or emulsion of the acrylamide polymer or copolymer may be provided as a composition comprising an aqueous dispersion or emulsion of the acrylamide polymer or copolymer. In exemplary embodiments, the aqueous dispersion or emulsion of the acrylamide polymer or copolymer is a fine aqueous dispersion or emulsion of the acrylamide polymer or copolymer. In exemplary embodiments, the one or more crosslinkers may be provided as a composition comprising the one or more crosslinkers. In exemplary embodiments, the monomers of the acrylamide polymer or copolymer and the one or more crosslinkers are each in the form of aqueous solutions, dispersions or emulsions.

As used herein, the term "acrylamide polymer" refers to a homopolymer of acrylamide and encompasses acrylamide polymers chemically modified (e.g., hydrolyzed) following polymerization.

As used herein the term "acrylamide copolymer" refers to a polymer comprising an acrylamide monomer and one or more comonomers. The comonomer may be anionic, cationic or non-ionic. In certain embodiments, the comonomer is hydrophobic. The acrylamide copolymer may be unmodified or chemically modified. Representative, non-limiting co-monomers include acrylic acid, vinyl acetate, vinyl alcohol and/or other unsaturated vinyl monomers.

In one embodiment, the acrylamide copolymer comprises an anionic comonomer. In some embodiments, the anionic monomer is selected from the group consisting of (meth)acrylic acid, alkali/alkaline/ammonium salts of (meth)acrylic acid, 2-acrylamido-2-methylpropanesulfonic acid, alkali/alkaline/ammonium salts of 2-acrylamido-2-methylpropanesulfonic acid, maleic acid, alkali/alkaline/ammonium salts of maleic acid and the like.

In another embodiment, the acrylamide copolymer comprises a cationic comonomer. In some embodiments, the cationic monomer is selected from the group consisting of (meth)acrylamidoethyltrimethylammonium chloride, (meth)acrylamido propyltrimethylammonium chloride and the like.

In another embodiment, the acrylamide copolymer comprises a non-ionic comonomer. In some embodiments, the non-ionic monomer is selected from the group consisting (meth)acrylamide, maleic anhydride.

In an exemplary embodiment, the acrylamide copolymer comprises an acrylamide monomer and an anionic comonomer, but does not include a cationic comonomer.

In one embodiment, the acrylamide polymer or copolymer is characterized by a charge of about 0% to about 40%, about 5% to about 35%, about 15% to about 30%, about 15% to about 20% or about 20% to about 30%. In one embodiment, the charge is in the range of about 5% to about 35% and provides a particularly high viscosity that provides substantial suspending power. In another embodiment, the charge is in the range of about 15% to about 20% and provides a particularly high viscosity that provides substantial suspending power.

In another embodiment, the acrylamide polymer or copolymer is characterized by a charge of about 10%, about 15%, about 20%, about 25%, about 30%, about 35% or about 40%. In an exemplary embodiment, the charge is an anionic charge.

The range of charge for the gel composition disclosed herein is a function of the charge of the polyacrylamide copolymer comprising charged monomers or the chemically modified polyacrylamide polymer or copolymer.

In a particular embodiment, the acrylamide copolymer comprises from about 30 to about 90, about 40 to about 80, about 50 to about 70 or about 60 mole % acrylamide.

In a particular embodiment, the weight ratio of the acrylamide monomer to the one or more comonomers is about 10:90 to 90:10.

In a particular embodiment, the acrylamide polymer or copolymer is characterized by a degree of hydrolysis of about 5 to about 10%, about 10 to about 15%, about 15 to about 20%, about 20 to about 25%, about 25 to about 30% or greater than about 30%. In a more particular embodiment, the acrylamide polymer or copolymer is characterized by a degree of hydrolysis of about 15, about 16, about 17, about 18, about 19 or about 20%.

In one embodiment, acrylamide polymers or copolymers are water dispersible.

In exemplary embodiments, a gel composition comprising an acrylamide polymer or copolymer crosslinked with one or more crosslinkers is formed by combining the monomers of the acrylamide polymer or copolymer and the one or more crosslinkers in an aqueous solution at a pH in the range of about 5 to about 12, or about 7.5 to about 11, and wherein the molar ratio of the one or more crosslinkers to monomers of the acrylamide polymer or copolymer is in the range of about greater than about 0.1 to about 2.0, or about 0.2 to about 2.0.

In exemplary embodiments, a gel composition comprising an acrylamide polymer or copolymer crosslinked with one or more crosslinkers is formed by combining an aqueous dispersion or emulsion of the acrylamide polymer or copolymer and the one or more crosslinkers in an aqueous solution at a pH in the range of about 5 to about 12, or about 7.5 to about 11, and wherein the molar ratio of the one or more crosslinkers to monomers of the acrylamide polymer or copolymer is in the range of about greater than about 0.1 to about 2.0, or about 0.2 to about 2.0.

In exemplary embodiments, a composition comprising an acrylamide polymer or copolymer crosslinked with one or more crosslinkers is formed by combining the monomers of the acrylamide polymer or copolymer and the one or more crosslinkers in an aqueous solution at a pH in the range of about 5 to about 12, or about 7.5 to about 11, and wherein the molar ratio of the one or more crosslinkers to monomers of the acrylamide polymer or copolymer is in the range of about greater than about 0.1 to about 2.0, or about 0.2 to about 2.0.

In exemplary embodiments, a composition comprising an acrylamide polymer or copolymer crosslinked with one or more crosslinkers is formed by combining a fine aqueous dispersion or emulsion of the acrylamide polymer or copolymer and the one or more crosslinkers in an aqueous solution at a pH in the range of about 5 to about 12, or about 7.5 to about 11, and wherein the molar ratio of the one or more crosslinkers to monomers of the acrylamide polymer or copolymer is in the range of about greater than about 0.1 to about 2.0, or about 0.2 to about 2.0.

In exemplary embodiments, the acrylamide polymer or copolymer has a weight average molecular weight of greater than or equal to about 0.5 million g/mol. In exemplary embodiments, the acrylamide polymer or copolymer has a weight average molecular weight of in the range of about 0.5 million g/mol to about 30 million g/mol.

In exemplary embodiments, the amount of the acrylamide polymer or copolymer used in the gel compositions can vary widely depending on the particular polymer used, the purity of the polymer, and properties desired in the final composition. In exemplary embodiments, the amount of the polymer used in the compositions is in the range of about 0.05 to about 5, about 0.1 to about 3, about 0.2 to about 2, or about 0.3 to about 1, weight percent based on the total weight of the composition.

As used herein, the terms "polymer," "polymers," "polymeric," and similar terms are used in their ordinary sense as understood by one skilled in the art, and thus may be used herein to refer to or describe a large molecule (or group of such molecules) that contains recurring units. Polymers may be formed in various ways, including by polymerizing monomers and/or by chemically modifying one or more recurring units of a precursor polymer. A polymer may be a "homopolymer" comprising substantially identical recurring units formed by, e.g., polymerizing a particular monomer. A polymer may also be a "copolymer" comprising two or more different recurring units formed by, e.g., copolymerizing two or more different monomers, and/or by chemically modifying one or more recurring units of a precursor polymer. A copolymer may be a "terpolymer" comprising three or more different recurring units formed by, e.g., copolymerizing three or more different monomers, and/or by chemically modifying one or more recurring units of a precursor polymer. A copolymer may be a "tetrapolymer" comprising four or more different recurring units formed by, e.g., copolymerizing four or more different monomers, and/or by chemically modifying one or more recurring units of a precursor polymer.

In exemplary embodiments, the one or more crosslinkers comprises an inorganic compound, for example a compound comprising zirconium, titanium, chromium, barium, calcium, manganese, zinc, nickel, strontium, boron or mixtures thereof. In exemplary embodiments, the compound is boric acid or a borate. In exemplary embodiments, the inorganic compound is a compound that releases multivalent metal ions.

In exemplary embodiments, the one or more crosslinkers comprises an organic compound, for example glyoxal, malondialdehyde, succindialdehyde, glutaraldehyde, adipaldehyde, o-phthaldehyde, m-phthaldehyde, p-phthaldehyde, any suitable dialdehyde compound, polyethylene imine, phenoUformaldehyde, glyoxlic acid, or mixtures thereof. In exemplary embodiments, the one or more crosslinkers comprises a dialdehyde, for example glyoxal, malondialdehyde, succindialdehyde, glutaraldehyde, adipaldehyde, o-phthaldehyde, m-phthaldehyde, p-phthaldehyde, any suitable dialdehyde compound, and mixtures thereof. In certain embodiments, the dialdehyde is glyoxal.

In exemplary embodiments, the one or more crosslinkers are used to crosslink the acrylamide moieties of the polymer. In exemplary embodiments, dialdehyde is used to crosslink the acrylamide moieties of the polymer.

In one embodiment, the gel composition comprises an acrylamide polymer or copolymer, crosslinked with glyoxal. In a particular embodiment, the gel composition comprises an acrylamide polymer or copolymer crosslinked with glyoxal, wherein the acrylamide polymer or copolymer is characterized by a charge in the range of about 5% to about 40% and provides a particularly high viscosity that provides substantial suspending power. In one embodiment, the charge is in the range of about 15% to about 20% and provides a particularly high viscosity that provides substantial suspending power. In a particular embodiment, the charge is about 10%, about 15%, about 20%, about 25%, about 30%, about 35% or about 40%.

In another embodiment, the gel composition comprises an acrylamide copolymer crosslinked with glyoxal. In a particular embodiment, the gel composition comprises an acrylamide copolymer crosslinked with glyoxal, wherein the acrylamide copolymer is characterized by a charge in the range of about 5% to about 40% and provides a particularly high viscosity that provides substantial suspending power. In one embodiment, the charge is in the range of about 15% to about 20% and provides a particularly high viscosity that provides substantial suspending power. In a particular embodiment, the charge is about 10%, about 15%, about 20%, about 25%, about 30%, about 35% or about 40%.

In exemplary embodiments, the molar ratio of the one or more crosslinkers to monomers of the acrylamide polymer or copolymer is greater than about 0.2, about 0.3, about 0.4, about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, about 2.0. In exemplary embodiments, the molar ratio of dialdehyde to monomers of the acrylamide polymer or copolymer is in the range of about greater than about 0.2 to about 2.0, about 0.5 to about 2.0, about 0.7 to about 2.0, about 0.8 to about 2.0, about 1.0 to about 2.0, about 1.1 to about 2.0, or about 1.0 to about 1.5. In a particular embodiment, the molar ratio of the one or more crosslinkers to monomers of the acrylamide polymer or copolymer is greater than about 1.0.

In exemplary embodiments, the gel composition is formed by combining the monomers of the acrylamide polymer or copolymer and the one or more crosslinkers in an aqueous solution at a pH greater than about 5.0, about 5.5, about 6.0, about 6.5, about 7.0, about 7.5, about 8.0, about 8.5, about 9.0, about 10.0, about 10.2, about 10.5, about 10.7, about 11, or about 11.5. In exemplary embodiments, the pH is in the range of about 5 to about 12, about 7.5 to about 11, about 8.5 to about 11, about 9.0 to about 11, about 10 to about 11, or about 10.2 to about 10.7. In a particular embodiment, the pH is greater than about 9.0. The pH modifying agents which may be used to modify the pH of the gel or the composition in which the gel is formed are any pH modifying agents suitable, for example basic compounds, which are inert relatively to the polymer and the one or more crosslinkers, for example inorganic compounds, such as alkaline and alkaline-earth hydroxides or salts, including but not limited to alkaline carbonate or phosphate.

In exemplary embodiments, the formation of the gel composition or the crosslinking of the acrylamide polymer or copolymer and the one or more crosslinkers occurs in less than about 1 hour, about 40 minutes, about 30 minutes, about 20 minutes, about 10 minutes, about 5 minutes, about 2 minutes, or about 1 minute.

In exemplary embodiments, the compositions or gel compositions according to the embodiments have a complex viscosity of greater than or equal to about 100 cP at about 100 sec$^{-1}$.

In exemplary embodiments, a method to produce a gel composition comprises combining or contacting an acrylamide polymer or copolymer component with a crosslinker component in an aqueous medium at a pH in the range of about 5 to about 12, or about 7.5 to about 11, wherein the molar ratio of the one or more crosslinkers in the crosslinker component to monomers of the acrylamide polymer or copolymer in the acrylamide polymer or copolymer component is in the range of about greater than about 0.1 to about 2.0, or about 0.2 to about 2.0, at a temperature and for a period of time sufficient to produce the gel composition.

In exemplary embodiments, acrylamide polymer or copolymer component comprises, or is in the form of, a fine aqueous dispersion or emulsion of the acrylamide polymer or copolymer. In exemplary embodiments, acrylamide polymer or copolymer component comprises, or is in the form of, monomers of the acrylamide polymer or copolymer in a solution, dispersion or emulsion. In exemplary embodiments, the acrylamide polymer or copolymer component comprises about 0.4 wt % of the acrylamide polymer or copolymer in the solution, dispersion or emulsion.

In exemplary embodiments, the crosslinker component comprises, or is in the form of, one or more crosslinkers in an aqueous solution. In exemplary embodiments, the crosslinker component comprises about 0.06 to about 0.7 wt. % of the one or more crosslinkers in an aqueous solution. In exemplary embodiments, the acrylamide polymer or copolymer component and the crosslinker component are each independently adjusted to a pH in the range of about 5 to about 12, or about 7.5 to about 11, prior the step of combining or contacting the components.

In exemplary embodiments, the aqueous medium comprises, or is in the form of, an aqueous solution, an aqueous emulsion, an aqueous dispersion or an aqueous slurry.

In exemplary embodiments, a method to produce a gel composition comprises combining or contacting monomers of an acrylamide polymer or copolymer, or a fine aqueous dispersion or emulsion of the acrylamide polymer or copolymer, with one or more crosslinkers in an aqueous solution at a pH in the range of about 5 to about 12, about 7.5 to about 11, wherein the molar ratio of one or more crosslinkers to monomers of the acrylamide polymer or copolymer is in the range of about greater than about 0.1 to about 2.0, or 0.2 to about 2.0, at a temperature and for a period of time sufficient to produce the gel composition.

In exemplary embodiments, the acrylamide polymer or copolymer component is prepared by shearing, agitating or stirring the acrylamide polymer or copolymer in an aqueous medium until a fine dispersion or emulsion is obtained. In exemplary embodiments, the pH of the fine aqueous dispersion or emulsion of the acrylamide polymer or copolymer is adjusted as desired, for example, adjusted to a pH in the range of about 5 to about 12, about 7.5 to about 11.

In exemplary embodiments, the step of combining or contacting the acrylamide polymer or copolymer component with crosslinker component in an aqueous solution, includes shearing, agitating or stirring the components to form a thoroughly blended mixture or a gel composition.

In exemplary embodiments, the final pH of the mixture or gel composition is recorded and tested for viscosity in a viscometer (e.g. a Grace Instrument M5600 HPHT Viscometer, or a Grace M3600 Viscometer).

In exemplary embodiments, the gel composition is produced at a temperature of greater than or equal to about 20° C., about 30° C., about 40° C., about 50° C., about 60° C., about 70° C., about 80° C., or about 90° C. In exemplary embodiments, the gel composition is produced in a period of time of about 1 minute to about 24 hours, about 5 minutes to about 2 hours, or about 10 minutes to about 1 hour.

In exemplary embodiments, emulsion polymerization may be used to prepare the polymers described herein.

Breakers

As used herein, the term "breaker" refers to any compound or mixture of compounds which reduces the viscosity of the well treatment fluid. In exemplary embodiments, the breaker is an iron-containing compound, for example a ferrous compound, ferrous salt, ferric compound or ferric salt. In exemplary embodiments, the ferrous salt is, for example, a ferrous salt having an organic anion, a ferrous salt having an inorganic anions, or a mixture thereof. In exemplary embodiments, the breaker or ferrous salt is ferrous chloride, ferrous bromide, ferrous fluoride, ferrous sulfate, ammonium iron sulfate and combinations thereof. In exemplary embodiments, the ferrous salt breaker comprises ferrous sulfate.

In exemplary embodiments, the ferric salt is, for example, a ferric salt having an organic anion, a ferric salt having an inorganic anion, or a mixture thereof. In exemplary embodiments, the ferric salt is, for example, a ferric salt having an organic anion, a ferric salt having an inorganic anion, or a mixture thereof. In exemplary embodiments, the breaker or ferric salt is ferric citrate, ferric chloride, ferric bromide, ferric fluoride, ferric sulfate, and combinations thereof. In exemplary embodiments, the ferric salt breaker comprises ferric citrate.

In exemplary embodiments, the breaker may be used or combined with other breakers, for example ammonium sulfate, ammonium persulfate, enzymes, copper compounds, ethylene glycol, glycol ethers and combinations thereof. In exemplary embodiments, the breaker comprises ferrous citrate in combination with ammonium persulfate. In exemplary embodiments, the breaker comprises ferrous sulfate in combination with ammonium persulfate.

In exemplary embodiments, the breaker may be used to facilitate decomposition of an exemplary gel composition or acrylamide polymer or copolymer as described herein. In exemplary embodiments, the breaker may be used to reduce the viscosity of an exemplary gel composition. In exemplary embodiments, the breaker may be used to facilitate decomposition of a gel composition or acrylamide polymer or copolymer into oligomeric fragments.

In exemplary embodiments, a breaker composition may consist essentially of one or more iron-containing compounds or, may further comprise the one or more iron-containing compounds, solvents, diluents, other breakers, and/or other suitable additives.

In exemplary embodiments, the breaker composition may comprise, or be used in combination with, one or more compounds or agents which may enhance or boost the performance of the breaker composition, e.g. booster compounds. Exemplary booster compounds may be used to enhance the rate of breaking compared to the rate of the breaker compound or composition in the absence of booster compounds. For example, booster compounds include, but are not limited to, urea; ethylenediaminetetraacetic acid (EDTA); salts of EDTA, e.g. sodium salts of EDTA; or other chelating agents such as citric acid, aminotricarboxylic acid and its salts, polyphosphonated and poly phosphate compounds, boric acid and its salts, alkali metal salts of carbonates, diethylenetriaminepentaacetic acid (DTPA), humic acids, and lignosulfates. Polyphosphonates include, for example, ethylenediaminetetra(methylenephosphonic acid); 1-hydroxyethylidene-1, 1-diphosphonic acid and aminotri (methylene phosphonic acid) and their salts. Examples of polyphosphates include adducts made from the reaction of polyhedric solvents such as glycerin and ethylene glycol with $P_2O_5$ to form polyphosphated mixtures. In a particular embodiment, the booster compound is urea, EDTA or a salt of EDTA. In another particular embodiment, the booster compound is a sodium salt of EDTA.

Well Treatment Fluids

In exemplary embodiments, a well treatment fluid comprises: a first composition comprising monomers of an acrylamide polymer or copolymer; a second composition comprising one or more crosslinkers; and a breaker composition comprising one or more iron-containing compounds. In exemplary embodiments, a well treatment fluid comprises: a first composition comprising an aqueous dispersion or emulsion of an acrylamide polymer or copolymer; a second composition comprising one or more crosslinkers; and a breaker composition comprising one or more iron-containing compounds. In exemplary embodiments, a well treatment fluid comprises a gel composition according to the embodiments and a breaker composition comprising one or more iron-containing compounds. In exemplary embodiments, the well treatment fluid further comprises water, wherein water is selected from fresh water, brine, aqueous-based foams, water-alcohol mixtures, and combinations thereof.

In exemplary embodiments, the well treatment fluid may further comprise, or maybe added to a wellbore in combination with, a pH modifying agent. In exemplary embodiments, the pH modifying agent is any suitable pH modifying agent and may be in the form of an aqueous solution, for example an aqueous solution comprising a base, an acid, a pH buffer, or any combination thereof. In exemplary embodiments, the pH modifying agent is a potassium carbonate and potassium hydroxide mixture or a sodium bicarbonate and sodium carbonate mixture. In exemplary embodiments, the pH modifying agent is in an amount sufficient (or calculated to be sufficient) to produce a downhole solution pH in the range of about 5 to about 12, about 7.5 to about 11. In exemplary embodiments, the pH modifying agent is in an amount sufficient (or calculated to be sufficient) to produce an in-situ gel composition comprising an acrylamide polymer or copolymer.

In exemplary embodiments, the well treatment fluid further comprises, or may be used in combination with, compounds or agents which may enhance or boost the performance of the breaker composition, i.e. booster compounds.

In exemplary embodiments, the well treatment fluid may further comprise other viscosifiers, other friction reducers, borate salts, proppants, acids, sodium chloride, emulsifiers, sodium and potassium carbonates, biocides, anti-scaling compounds, corrosion preventing compounds, or other suitable additives.

In exemplary embodiments, the wellbore treatment fluid optionally comprises a proppant, for example natural or synthetic proppants, including but not limited to glass beads, ceramic beads, sand, gravel, and bauxite. Exemplary proppants may be coated or contain chemicals; more than one can be used sequentially or in mixtures of different sizes or different materials. The proppant may be resin coated (curable), or pre-cured resin coated. The proppant may be any suitable shape, including substantially spherical materials, fibrous materials, polygonal materials (such as cubic materials), and combinations thereof. In one embodiment, the proppant is a reduced density proppant.

In exemplary embodiments, the monomers of the acrylamide polymer or copolymer are in an amount of about 0.005% to about 5%, 0.01% to about 1%, or 0.05% to about 0.5% of the well treatment fluid volume. In exemplary embodiments, the one or more crosslinkers are in an amount of about 0.01% to about 1% of the well treatment fluid volume. In exemplary embodiments, the one or more iron-containing compounds are in an amount of 0.005% to about 0.05%, or about 0.075% to about 0.02% of the well treatment fluid volume.

In exemplary embodiments, friction reducers, viscosifiers, other breakers, proppants, and/or other additives used in the oil industry and known in the art may be added to a well treatment fluid. In exemplary embodiments, the well treatment fluid may further comprise acids, hydrochloric acid, acetic acid, sodium chloride, ethylene glycol, scale reducers, sodium carbonate, potassium carbonate, biocides, borate salts, corrosion inhibitors, citric acid, non-emulsifiers, emulsifiers, mineral control agents, delay additives, silt suspenders, flowback additives, isopropanol, methanol, and combinations thereof.

In exemplary embodiments, the well treatment fluid comprises one or more viscosifiers. In exemplary embodiments, the well treatment fluid comprises one or more viscosifiers that is a hydratable polymer, for example galactomannan gums, guars, derivatized guars, cellulose and cellulose derivatives, starch, starch derivatives, xanthan, derivatized xanthan and mixtures thereof. In exemplary embodiments, the viscosifier comprises a hydratable polymer selected form the group consisting of guar gum, guar gum derivative, locust bean gum, welan gum, karaya gum, xanthan gum, scleroglucan, diutan, cellulose, cellulose derivatives and combinations thereof. In exemplary embodiments, the viscosifier comprises a hydratable polymer selected form the group consisting of hydroxypropyl guar (HPG), carboxymethyl hydroxypropyl guar (CMHPG), hydroxyethyl cellulose (HEC), carboxymethyl hydroxyethyl cellulose (CMHEC), carboxymethyl cellulose (CMC), dialkyl carboxymethyl cellulose, and combinations thereof. In exemplary embodiments, the viscosifier is selected form the group consisting of phosphomannans, scleroglucans, dextrans and combinations thereof. In exemplary embodiments, the well treatment fluid does not comprise one or more of the group consisting of: galactomannan gums, guars, derivatized guars, cellulose and cellulose derivatives, starch, starch derivatives, xanthan, and derivatized xanthan.

In exemplary embodiments, the viscosifier can be in the form of dry powder, carried (suspended) in liquid or dissolved in a liquid.

As used herein, the terms "well treatment fluid", "pressurized fluid" or "fracturing fluid" refer to a fluid composition that useful in oil field applications including, for example, low-volume hydraulic fracturing, high-volume hydraulic fracturing, slick water fracturing and well stimulation; for oil, gas or geothermal energy wells, as well as cleanup related thereto. In exemplary embodiments, the well treatment fluid can be an aqueous fluid, gel, foam or slick-water-based. In exemplary embodiments, the well treatment fluid is of sufficient viscosity to facilitate fracturing of a formation.

In exemplary embodiments, the well treatment fluid is used in a hydraulic fracturing application before, with or after other well treatment fluids. In exemplary embodiments, the wellbore treatment fluid can be used in any well treatment where viscosification is desired including but not limited to stimulation and completion operations. For example, the wellbore treatment fluid can be used for hydraulic fracturing applications. In these applications, the fracturing fluid, i.e. well treatment fluid, can be configured as a gelled fluid, a foamed gel fluid, acidic fluids, water and potassium chloride treatments, and the like. The fluid is injected at a pressure effective to create one or more fractures in the subterranean formation. Depending on the type of well treatment fluid utilized, various additives may also be added to the fracturing fluid to change the physical properties of the fluid or to serve a certain beneficial function. In one embodiment, a propping agent such as sand or other hard material is added which serves to keep the fractures open after the fracturing operation. Also, fluid loss agents may be added to partially seal off the more porous sections of the formation so that the fracturing occurs in the less porous strata. Other oilfield additives that may also be added to the fracturing fluid include antifoams, scale inhibitors, $H_2S$ and or $O_2$ scavengers, biocides, crosslinking agents, surface tension reducers, breakers, buffers, surfactants and non-emulsifiers, fluorocarbon surfactants, clay stabilizers, fluid loss additives, foamers, friction reducers, temperature stabilizers, diverting agents, shale and clay stabilizers, paraffin/asphaltene inhibitors, corrosion inhibitors.

In exemplary embodiments, the wellbore treatment fluid may optionally further comprise additional additives, including, but not limited to, acids, fluid loss control additives, gas, corrosion inhibitors, scale inhibitors, catalysts, clay control agents, biocides, friction reducers, combinations thereof and the like. For example, in some embodiments, it may be desired to foam the storable composition using a gas, such as air, nitrogen, or carbon dioxide.

In exemplary embodiments, the well treatment fluid may be added to the wellbore in a proppant-free stage or a proppant-laden stage. In exemplary embodiments, they may be added to the wellbore may be added in a friction reducer-free stage or a friction reducer-laden stage.

Methods

In exemplary embodiments, a method of treating a wellbore comprises injecting into the wellbore: a first composition comprising monomers of an acrylamide polymer or copolymer; a second composition comprising one or more crosslinkers; and a breaker composition comprising one or more iron-containing compounds. In exemplary embodiments, a method of treating a wellbore comprises injecting into the wellbore: a first composition comprising an aqueous dispersion or emulsion of an acrylamide polymer or copolymer; a second composition comprising one or more crosslinkers; and a breaker composition comprising one or more iron-containing compounds. In exemplary embodiments, the breaker composition is injected into the wellbore substantially at the same time as the first composition. In exemplary embodiments, the first composition and the breaker composition are blended and injected into the wellbore. In exemplary embodiments, the breaker composition is injected into the wellbore substantially at the same time as the first and second compositions. In exemplary embodiments, the breaker composition is injected into the wellbore after the first and second compositions, for example after a delay. In exemplary embodiments, the breaker composition is injected into the wellbore after the first and second compositions, for example immediately after injection of the first and second compositions or without delay. In exemplary embodiments, the breaker composition is injected into the wellbore before the first and second compositions. In exemplary embodiments, the breaker composition is injected into the wellbore first, the first composition is injected into the wellbore after the breaker composition, and the second composition is injected into the wellbore after the first composition. In exemplary embodiments, the injection of a composition as described herein immediately follows the injection of another composition, e.g. without delay. In exemplary embodiments, the injection of a composition as described herein follows the injection of another composition within about 5 minutes, about 4, minutes, about 3 minutes, about 2 minutes or about 1 minute.

In exemplary embodiments, a method of treating a wellbore comprises injecting into the wellbore a gel composition according to the embodiments and a breaker composition comprising one or more iron-containing compounds. In exemplary embodiments, the gel composition is pre-formed and subsequently injected into the wellbore. In exemplary embodiments, the breaker composition is injected into the wellbore substantially at the same time as the gel composition. In exemplary embodiments, the breaker composition is injected into the wellbore after the gel composition, for example after a delay. In exemplary embodiments, the breaker composition is injected into the wellbore before the gel composition.

In exemplary embodiments, a method of treating a wellbore comprises injecting into the wellbore a wellbore treatment fluid according to the embodiments.

In exemplary embodiments, a method of treating a wellbore comprises: injecting into the wellbore a composition comprising monomers of an acrylamide polymer or copolymer; injecting into the wellbore a composition comprising one or more crosslinkers; and injecting into the wellbore a pH modifying agent in an amount sufficient (or calculated to be sufficient) to produce a downhole solution pH in the range of about 5 to about 12, about 7.5 to about 11, to produce an in-situ gel composition comprising an acrylamide polymer or copolymer crosslinked with one or more crosslinkers; and injecting into the wellbore a breaker composition comprising one or more iron-containing compounds.

In exemplary embodiments, a method of treating a wellbore comprises: injecting into the wellbore a composition comprising an aqueous dispersion or emulsion of an acrylamide polymer or copolymer into a wellbore; injecting into the wellbore a composition comprising one or more crosslinkers; and injecting into the wellbore a pH modifying agent in an amount sufficient (or calculated to be sufficient) to produce a downhole solution pH in the range of about 5 to about 12, about 7.5 to about 11, to produce an in-situ gel composition comprising an acrylamide polymer or copolymer crosslinked with one or more crosslinkers; and injecting into the wellbore a breaker composition comprising one or more iron-containing compounds.

In exemplary embodiments, the composition comprising monomers of an acrylamide polymer or copolymer, the composition comprising one or more crosslinkers, the breaker composition comprising one or more iron-containing compounds, and the pH modifying agents or agents are injected into the wellbore separately, simultaneously, or any combination thereof. In exemplary embodiments, the composition comprising an aqueous dispersion or emulsion of an acrylamide polymer or copolymer, the composition comprising one or more crosslinkers, the breaker composition comprising one or more iron-containing compounds, and the pH modifying agents or agents are injected into the wellbore separately, simultaneously, or any combination thereof.

In exemplary embodiments, the gel, the breaker composition comprising one or more iron-containing compounds, and the pH modifying agents or agents are injected into the wellbore separately, simultaneously, or any combination thereof.

In exemplary embodiments, the composition comprising monomers of an acrylamide polymer or copolymer comprises pH modifying agents. In exemplary embodiments, the composition comprising an aqueous dispersion or emulsion of an acrylamide polymer or copolymer comprises pH modifying agents. In exemplary embodiments, the composition comprising the one or more crosslinkers, or crosslinker component, comprises pH modifying agents. In exemplary embodiments, the gel composition comprises pH modifying agents. In exemplary embodiments, the composition comprising monomers of an acrylamide polymer or copolymer and the composition comprising one or more crosslinkers may be combined and then injected into the well bore either prior to or after the injection of the pH modifying agents. In exemplary embodiments, the composition comprising an aqueous dispersion or emulsion of an acrylamide polymer or copolymer and the composition comprising one or more crosslinkers may be combined and then injected into the well bore either prior to or after the injection of the pH modifying agents.

In exemplary embodiments, the pH modifying agents include one or more types of pH modifying agents and may be in the form of an aqueous solution, for example an aqueous solution comprising a base, an acid, a pH buffer, or any combination thereof. In exemplary embodiments, the pH modifying agent is a potassium carbonate and potassium hydroxide mixture or a sodium bicarbonate and sodium carbonate mixture.

In exemplary embodiments, a composition comprising monomers, or an aqueous dispersion or emulsion, of an acrylamide polymer or copolymer may contain from about 0.05 to about 5%, or from about 0.2 to about 5% by weight monomers or polymer, based on the total weight of the composition. In exemplary embodiments, a composition comprising one or more crosslinkers may contain a sufficient amount of the one or more crosslinkers to provide a crosslinker to monomer ratio of from about 0.1 to about 2.0, or about 0.2 to about 2.0. Accordingly, the amounts sufficient may be determined based on calculations which include assumptions about the downhole conditions. The presence of a gel down hole may be determined by indicators other than rheological measurements.

In exemplary embodiments, the methods, compositions and wellbore treatment fluids described herein may be used for carrying out a variety of subterranean treatments, including, but not limited to, drilling operations, fracturing treatments, and completion operations (e.g., gravel packing). In exemplary embodiments, the methods, compositions and wellbore treatment fluids may be used in treating a portion of a subterranean formation. In exemplary embodiments, the methods, compositions and wellbore treatment fluids may be introduced into a well bore that penetrates the subterranean formation. In exemplary embodiments, the methods, compositions and wellbore treatment fluids may be used in fracturing treatments.

The methods, compositions and wellbore treatment fluids of the present embodiments may be used in any subterranean treatment as desired. Such subterranean treatments include, but are not limited to, drilling operations, stimulation treatments, and completion operations. Those of ordinary skill in the art, with the benefit of this disclosure, will be able to recognize a suitable subterranean treatment where friction reduction may be desired.

In exemplary embodiments, the wellbore treatment fluid, compositions and methods can be used in or injected into fresh water, salt water or brines.

In exemplary embodiments, wellbore treatment fluid, gel compositions and methods can be used within a temperature range of about 20° C. to about 205° C., about 50° C. to about 200° C., or about 70° C. to about 200° C.

In exemplary embodiments, a method of fracturing a subterranean formation comprises: providing a wellbore treatment fluid according to the present embodiments, and placing the wellbore treatment fluid into a subterranean formation so as to create or enhance a fracture in the subterranean formation.

In exemplary embodiments, a method of fracturing a subterranean formation comprises: providing a first composition comprising monomers of an acrylamide polymer or copolymer; a second composition comprising one or more crosslinkers, and a breaker composition comprising one or more iron-containing compounds; and placing the compositions into a subterranean formation so as to create or enhance a fracture in the subterranean formation.

In exemplary embodiments, a method of fracturing a subterranean formation comprises: providing a first composition comprising an aqueous dispersion or emulsion of an acrylamide polymer or copolymer; a second composition comprising one or more crosslinkers, and a breaker composition comprising one or more iron-containing compounds; and placing the compositions into a subterranean formation so as to create or enhance a fracture in the subterranean formation.

In exemplary embodiments, a method of fracturing a subterranean formation comprises: providing a gel composition as described herein and a breaker composition comprising one or more iron-containing compounds; and placing the compositions into a subterranean formation so as to create or enhance a fracture in the subterranean formation.

In exemplary embodiments, a method of fracturing a subterranean formation comprises: providing a wellbore treatment fluid according to the present embodiments, pumping the wellbore treatment fluid or gel composition so as to form or extend a fracture in the subterranean formation and deposit the wellbore treatment fluid or gel composition in the fracture.

In exemplary embodiments, a method of fracturing a subterranean formation comprises: providing a first composition comprising monomers of an acrylamide polymer or copolymer; a second composition comprising one or more crosslinkers, and a breaker composition comprising one or more iron-containing compounds; pumping the compositions so as to form or extend a fracture in the subterranean formation and deposit the compositions in the fracture.

In exemplary embodiments, a method of fracturing a subterranean formation comprises: providing a first composition comprising an aqueous dispersion or emulsion of an acrylamide polymer or copolymer; a second composition comprising one or more crosslinkers, and a breaker composition comprising one or more iron-containing compounds; pumping the compositions so as to form or extend a fracture in the subterranean formation and deposit the compositions in the fracture.

In exemplary embodiments, a method of fracturing a subterranean formation comprises: providing a gel composition as described herein and a breaker composition comprising one or more iron-containing compounds; pumping the compositions so as to form or extend a fracture in the subterranean formation and deposit the compositions in the fracture.

In exemplary embodiments, the method further comprises allowing the well treatment fluid, gel composition, or the gel formed from the compositions, in the fracture to break. In exemplary embodiments, the method further comprises the addition of one or more other breaking agents or breakers, for example persulfates of ammonium, sodium and potassium, sodium perborate, hydrogen peroxide, organic peroxides, percarbonates, perphosphates, organic acids, perphosphate esters, amides, ammonium sulfate, enzymes, copper compounds, ethylene glycol, glycol ethers, and combinations thereof. In exemplary embodiments, the one or more breakers can be applied to the fluids or compositions in the form of solid, liquid, solution, dry powder, or suspension.

In exemplary embodiments, the one or more breakers can be applied to the compositions or fluids in an encapsulated form, for example is a form which delays the release of the one or more breakers to the composition or gel composition. In exemplary embodiments, the one or more breakers may be used to facilitate decomposition of an exemplary composition or fluid described herein, for example to facilitate decomposition of the crosslinked acrylamide polymer or copolymer into fragments.

In exemplary embodiments, the one or more breakers reduces the viscosity of the exemplary well treatment fluid or compositions over a period of time. In exemplary embodiments, the one or more breakers reduces the molecular weight, or generates fragments, of the crosslinked acrylamide polymer or copolymer. In exemplary embodiments, the addition of the one or more breakers results in decreasing the viscosity of the exemplary well treatment fluid or compositions.

In exemplary embodiments, the method of fracturing a subterranean formation comprises placing the breaker composition into the subterranean formation simultaneously or sequentially with the wellbore treatment fluid or other compositions. In exemplary embodiments, the breaker composition is placed into the subterranean formation simultaneously with the wellbore treatment fluid or other compositions. In exemplary embodiments, the breaker composition is placed into the subterranean formation before with the wellbore treatment fluid or other compositions. In exemplary embodiments, the breaker composition is placed into the subterranean formation simultaneously after the wellbore treatment fluid or other compositions.

In exemplary embodiments, the method of fracturing a subterranean formation comprises pumping the breaker composition into the subterranean formation simultaneously or sequentially with the wellbore treatment fluid or other compositions. In exemplary embodiments, the breaker composition is pumped into the subterranean formation simultaneously with the wellbore treatment fluid or other compositions. In exemplary embodiments, the breaker composition is pumped into the subterranean formation before with the wellbore treatment fluid or other compositions. In exemplary embodiments, the breaker composition is pumped into the subterranean formation simultaneously after the wellbore treatment fluid or other compositions.

In exemplary embodiments, the methods comprise injecting the well treatment fluids or compositions into the well bore at a pressure and flow rate sufficient to fracture the subterranean formation. In exemplary embodiments, the well treatment fluid further comprises a proppant. In exemplary embodiments, the gel composition further comprises a proppant. In exemplary embodiments, the breaker composition further comprises a proppant. In exemplary embodiments, the first composition comprising monomers of an acrylamide polymer or copolymer or an aqueous dispersion or emulsion of an acrylamide polymer or copolymer further comprises a proppant. In exemplary embodiments, the second composition comprising one or more crosslinkers further comprises a proppant.

In exemplary embodiments, the breaker composition reduces the viscosity of the well treatment fluid or other compositions to less than about 10 cP at a shear late of 100 $s^{-1}$, about 5 cP at a shear rate of 100 $s^{-1}$, about 2 cP at a shear rate of 100 $s^{-1}$, about 20 cP at a shear rate of 100 $s^{-1}$, about 10 cP at a shear rate of 100 $s^{-1}$, or about 3 cP at a shear rate of 100 $s^{-1}$.

In exemplary embodiments, the breaker composition initiates breaking at ambient temperatures. In exemplary embodiments, the breaker composition initiates breaking under heating.

In exemplary embodiments, the methods may be used to enhance the biodegradation of the well treatment fluid or other compositions according to the embodiments.

In exemplary embodiments, the breaker composition generates oligomeric fragments of an acrylamide-containing polymer in the well treatment fluid or other compositions. In exemplary embodiments, the oligomeric fragments of the acrylamide-containing polymer generated by the breaker composition are biodegradable. In exemplary embodiments, the breaker composition generates oligomeric fragments of the acrylamide-containing polymer having a molecular weight of less than about 400,000, about 300,000, or about 200,000 g/mol.

In exemplary embodiments, the decrease in the viscosity of the well treatment fluid or other compositions allows for easier recovery of the well treatment fluid or other compositions. In exemplary embodiments, the viscosity of the well treatment fluid or other compositions with the breaker composition is less than the viscosity of well treatment fluid or other compositions without the breaker composition. In exemplary embodiments, the exemplary breaker composition reduces the viscosity of the well treatment fluid or other compositions faster than conventional breakers. In exemplary embodiments, the exemplary breaker composition reduces the viscosity of the well treatment fluid or other compositions faster than ammonium persulfate. In exemplary embodiments, the breaker composition acting on the well treatment fluid or other compositions increases the fracture conductivity within the formation.

In any of the foregoing methods, the breaker composition may comprise, or be used in combination with, compounds or agents which may enhance or boost the performance of the breaker composition, i.e. booster compounds.

Suitable adjustments to the ratios of the components that will affect the conditions in which the viscosity of the well treatment fluid or other compositions is reduced, or in which the acrylamide-containing polymer breaks down, will be apparent to those of skill in the art.

In the exemplary embodiments, the well treatment fluid or other compositions may be handled or processed in any manner as necessary or desired. In exemplary embodiments, the well treatment fluid or other compositions should be handled in compliance with governmental regulations. In exemplary embodiments, the well treatment fluid or other compositions may be disposed of, processed for environmental remediation, or recycled. In the exemplary embodiments, the breaker composition may be used in the disposal, environmental remediation or recycling of the well treatment fluid or other compositions. In the exemplary embodiments, recycled well treatment fluid or other compositions may be used at any point where the well treatment fluid or other compositions is used.

The term "treatment", or "treating", refers to any subterranean operation that uses a fluid in conjunction with a desired function and/or for a desired purpose. The term "treatment", or "treating", does not imply any particular action by the fluid.

The term "fracturing" refers to the process and methods of breaking down a geological formation and creating a fracture, i.e. the rock formation around a well bore, by pumping fluid at very high pressures (pressure above the determined closure pressure of the formation), in order to increase production rates from or injection rates into a hydrocarbon reservoir. The fracturing methods otherwise use conventional techniques known in the art.

The following examples are presented for illustrative purposes only, and are not intended to be limiting.

Examples

Example 1

Preparation and Viscosity Analysis of Exemplary Glyoxal-Crosslinked-Polymer Gels Exemplary gels were prepared by the following protocol. About 0.4 wt % of active acrylamide polymer in water was stirred for about 10 minutes to about 20 minutes at room temperature. Once the solution was thoroughly blended, the pH of the solution was measured and adjusted using a pH buffer solution to about 9.8 to about 10.3. The solution was divided, and three levels of glyoxal were added to the solutions: 0.33, 0.49 or 0.65 wt. % of glyoxal. The mixture was stirred until the glyoxal was well incorporated. The viscosity of each of the resulting gels was measured on a Grace Instrument M5600 HPHT Viscometer at 180° F.

The Grace Instrument M5600 HPHT Viscometer is a true Couette, coaxial cylinder, rotational, high pressure and temperature viscometer. The instrument is fully automated and all data acquisition was under computer control. The temperature of the sample was maintained with an oil bath. The gel was also subjected to pressure with nitrogen gas to prevent boiling off the solvent. After 20 minutes of shear conditioning, the gel was subjected to a shear sweep which could be programmed in the software that accompanies the Viscometer. The data acquired from the computer was processed and plotted as desired.

FIG. 1 shows the viscosity analyses of three exemplary gels and, for comparison, a guar gel.

Example 2

Charge-Viscosity Analysis of Exemplary Dry and Emulsion Glyoxal-Crosslinked-Polymer Gels In the example, compositions were prepared by adding 200 mL of 2% KCl to a Waring blender jar. Approximately 0.3% of active acrylamide/acrylic acid copolymer was added along with the pH buffer and mixed for a few minutes. Approximately 0.33% glyoxal was added (to provide a molar ratio of glyoxal to monomer of about 1.35) and blended for a few seconds. The obtained crosslinked gel was evaluated on an Anton Paar Physica Rheometer setup with concentric cylinder geometry. The gel was sheared at a constant shear rate of 100 s$^{-1}$ and at a temperature of 180° F. The viscosity reported in the table is an average reading measured over 30 minutes.

Analysis of Charge-Viscosity was evaluated for a range of dry PAM (DPAM), partially hydrolyzed PAM (HYPAM) and emulsion PAM (EPAM) polymers. Series were arranged in three groups with increasing charges for each group.

TABLE 1

Viscosity of Exemplary Dry and Emulsion Glyoxal-Crosslinked-Polymer Gels

| Sample# | Product Form | Charge (mole %) | Viscosity (cP) |
|---|---|---|---|
| 1 | DPAM | 2 | 5 |
| 2 | DPAM | 13 | 463 |
| 3 | DPAM | 23 | 343 |
| 4 | DPAM | 33 | 33 |
| 5 | DPAM | 53 | 14 |
| 6 | HYPAM | 3 | 18 |
| 7 | HYPAM | 10 | 677 |
| 8 | HYPAM | 15 | 1326 |
| 9 | HYPAM | 20 | 463 |
| 10 | HYPAM | 30 | 118 |
| 11 | HYPAM | 40 | 57 |
| 12 | EPAM | 5 | 44 |
| 13 | EPAM | 10 | 412 |
| 14 | EPAM | 15 | 818 |
| 15 | EPAM | 20 | 475 |
| 16 | EPAM | 30 | 306 |
| 17 | EPAM | 40 | 32 |

Conditions: 0.3% active polymer, crosslinked with 0.33% glyoxal, in 2% KCl solution.

As shown in the Table 1, there is an influence of charge on gel viscosity and performance.

Example 3

Viscosity Analysis of Breakers on Exemplary Glyoxal-Crosslinked-Polymer Gels

In this example, reduction in the viscosity of a fluid was examined by treatment with exemplary and commercially available (comparative) breaker compositions. The compositions were prepared by adding 200 g of 2% KCl to a Waring blender jar. Approximately 0.3% of hydrolyzed polyacrylamide (HYPAM) was added to the compositions along with the pH buffer and mixed for a few minutes. Approximately 0.33% glyoxal was added to the samples and blended for a few seconds to form crosslinked gel samples.

Breaker compositions were added to the samples, in the amounts indicated. Breaker composition #1 included $FeSO_4.7H_2O$. Breaker composition #2 included $FeSO_4.7H_2O$ and $Na_2(EDTA).2H_2O$ (43:57, by weight). The breaker compositions were prepared by dissolving the breaker composition in water to form 10% solution. Then the breaker compositions were mixed with the exemplary gel samples.

Figure 2:
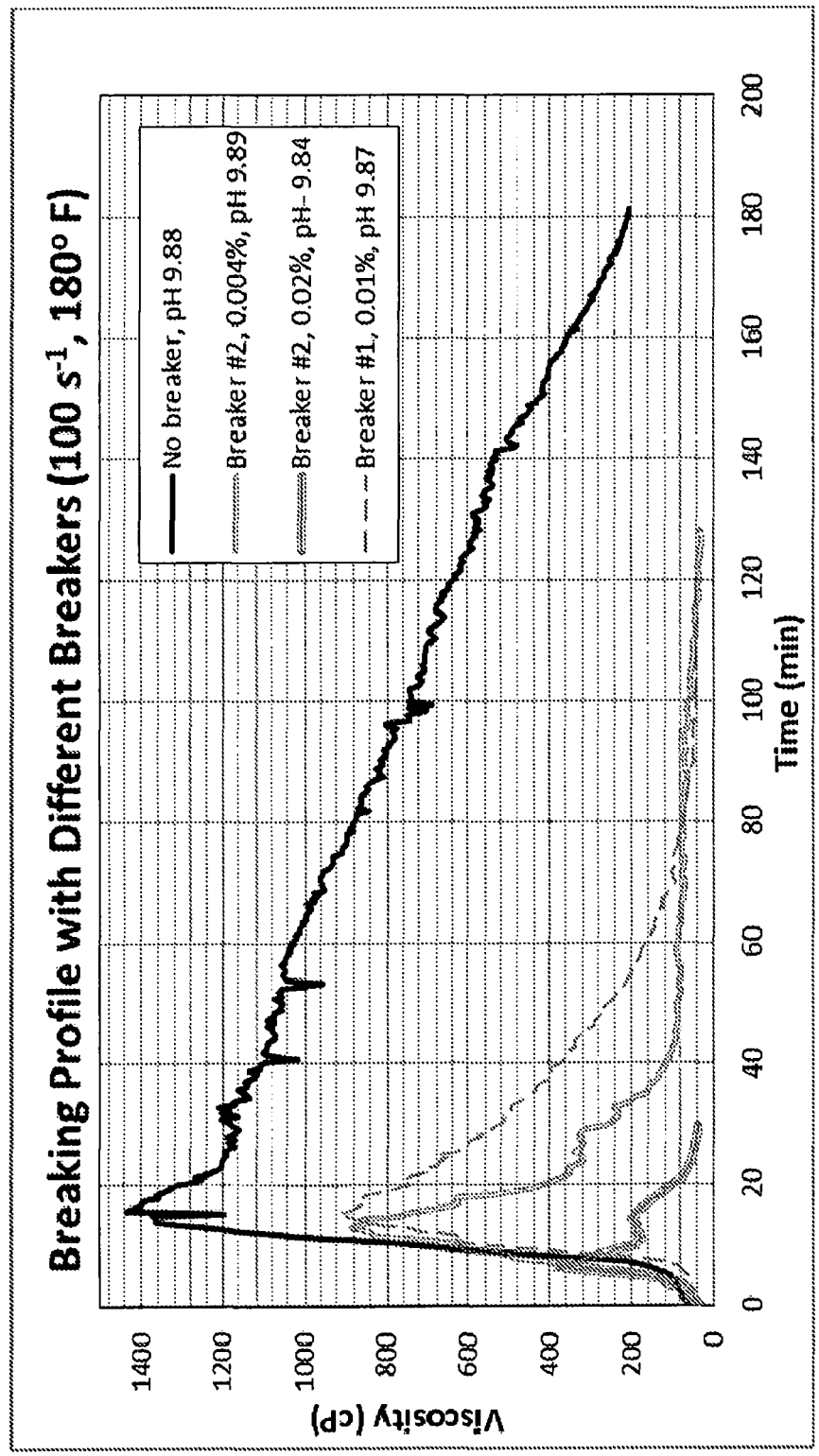
FIGS. 2 and 3 show the change in viscosity for compositions comprising exemplary gels and exemplary gels in combination with exemplary breakers.

The pH of each sample formulation was measured and recorded, as shown in FIG. 2. Each sample formulation was heated at 180° F. for about 3 hours and the viscosity was measured during the heating period by a Grace 3600 Viscometer (see FIGS. 2 and 3). Grace 3600 Viscometer is a true Couette, coaxial cylinder, rotational viscometer. The instrument was controlled by a computer program. The temperature of the sample was maintained by a heater cup provided with the instrument. The data acquired over time was processed and plotted as desired.

Figure 3:
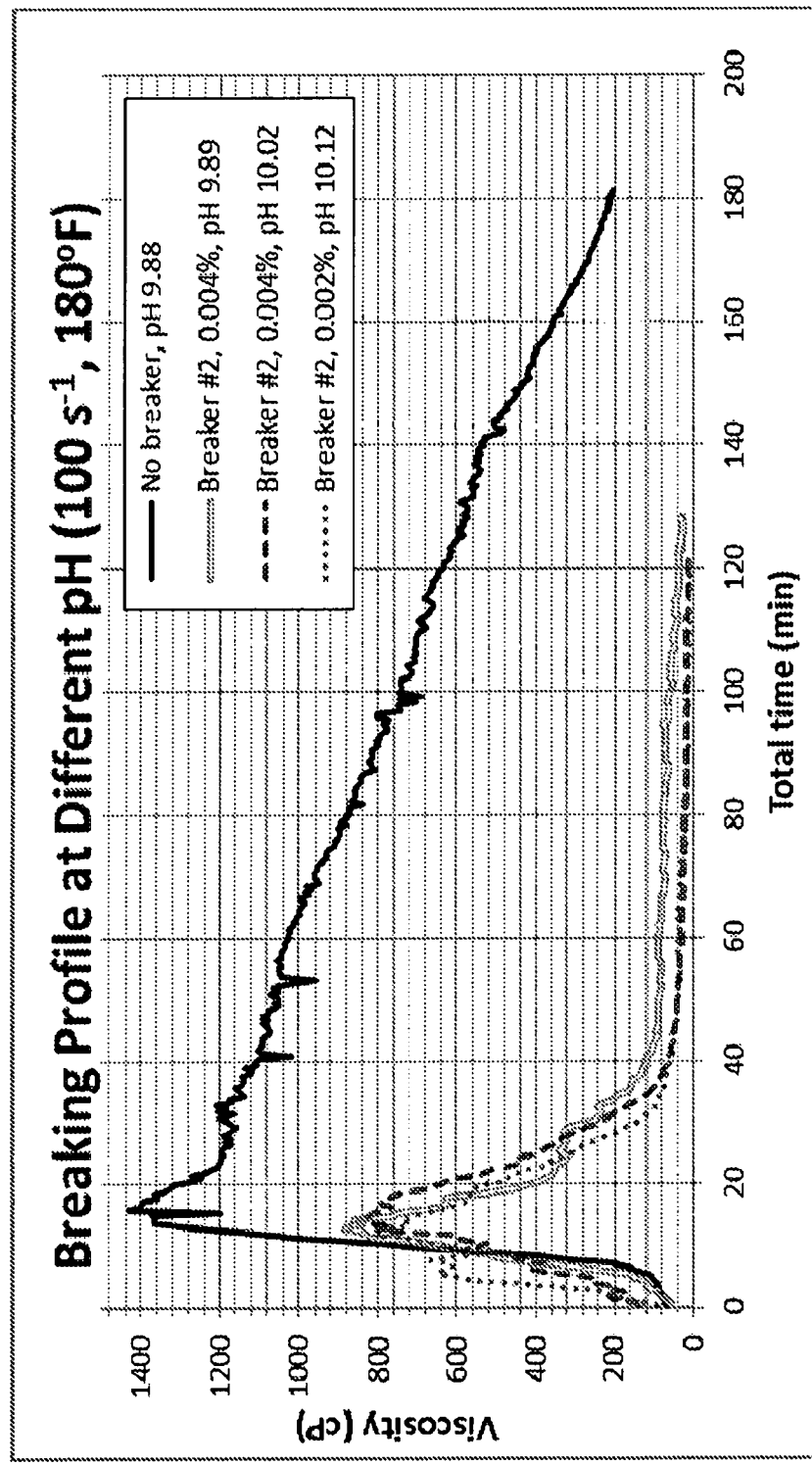

Additional buffer was added so some samples to increase the pH. The volume of the buffer added dictated the change in pH in the samples shown in FIG. 3. FIG. 3 shows the results obtained when Grace 3600 Viscometer was used to measure the viscosity of the samples at a shear rate of 100 s$^{-1}$ and temperature of 180° F.

In the preceding specification, various exemplary embodiments have been described. It will, however, be evident that various modifications and changes may be made thereto, and additional embodiments may be implemented, without departing from the broader scope of the exemplary embodiments as set forth in the claims that follow. The specification and drawings are accordingly to be regarded in an illustrative rather than restrictive sense.

We claim:

1. A well treatment fluid comprising:
    (i) a first composition comprising monomers of an acrylamide polymer or copolymer, or an aqueous dispersion or emulsion of an acrylamide polymer or copolymer;
    (ii) a second composition comprising one or more crosslinkers; and
    (iii) a breaker consisting of one or more water-soluble iron-containing compounds and one or more booster compounds selected from the group consisting of ethylenediaminetetraacetic acid (EDTA); salts of EDTA; citric acid; aminotricarboxylic acid and its salts; ethylenediaminetetra(methylenephosphonic acid), 1-hydroxyethylidene-1, 1-diphosphonic acid and aminotri (methylene phosphonic acid) and their salts; boric acid and its salts; alkali metal salts of carbonates; diethylenetriaminepentaacetic acid (DTPA); and lignosulfates.

2. The well treatment fluid of claim 1, wherein the one or more water-soluble iron-containing compounds is selected from the group consisting of a ferrous compound, ferrous salt, ferric compound and ferric salt.

3. The well treatment fluid of claim 1, wherein the one or more water-soluble iron-containing compounds is selected from the group consisting of ferrous chloride, ferrous bromide, ferrous fluoride, ferrous sulfate, ferrous citrate, ammonium iron sulfate and combinations thereof.

4. The well treatment fluid of claim 1, wherein the one or more crosslinkers are selected from the group consisting of compounds comprising zirconium, titanium, chromium, barium, calcium, manganese, zinc, nickel, strontium, boron and mixtures thereof.

5. The well treatment fluid of claim 1, wherein the one or more crosslinkers are selected from the group consisting of glyoxal, malondialdehyde, succindialdehyde, glutaraldehyde, adipaldehyde, o-phthaldehyde, m-phthaldehyde, p-phthaldehyde, polyethylene imine, phenol/formaldehyde, glyoxlic acid, and mixtures thereof.

6. The well treatment fluid of claim 1, wherein the first composition is in the form of monomers of an acrylamide polymer or copolymer.

7. The well treatment fluid of claim 6, wherein the one or more iron-containing compounds is selected from the group consisting of a ferrous compound, a ferrous salt, a ferric compound and a ferric salt.

8. The well treatment fluid of claim 6, wherein the one or more iron-containing compounds is selected from the group consisting of ferrous chloride, ferrous bromide, ferrous fluoride, ferrous sulfate, ammonium iron sulfate and combinations thereof.

9. The well treatment fluid of claim 6, wherein the one or more crosslinkers are selected from the group consisting of compounds comprising zirconium, titanium, chromium, barium, calcium manganese, zinc, nickel, strontium, boron and mixtures thereof.

10. The well treatment of claim 6, wherein the one or more crosslinkers are selected from the group consisting of glyoxal, malondialdehyde, succindialdehyde, glutaraldehyde, adipaldehyde, o-phthaldehyde, m-phthaldehyde, p-phthaldehyde, any suitable dialdehyde compound, polyethylene imine, phenol/formaldehyde, glyoxlic acid, and mixtures thereof.

11. The well treatment fluid of claim 1, wherein the first composition is in the form of an aqueous dispersion or emulsion of an acrylamide polymer or copolymer.

12. The well treatment fluid of claim 11, wherein the one or more water-soluble iron-containing compounds is selected from the group consisting of a ferrous compound, a ferrous salt, a ferric compound and a ferric salt.

13. The well treatment fluid of claim 11, wherein the one or more water-soluble iron-containing compounds is selected from the group consisting of ferrous chloride, ferrous bromide, ferrous fluoride, ferrous sulfate, ferrous citrate, ammonium iron sulfate and combinations thereof.

14. The well treatment fluid of claim 11, wherein the one or more crosslinkers are selected from the group consisting of compounds comprising zirconium, titanium, chromium, barium, calcium, manganese, zinc, nickel, strontium, boron and mixtures thereof.

15. The well treatment fluid of claim 11, wherein the one or more crosslinkers are selected from the group consisting of glyoxal, malondialdehyde, succindialdehyde, glutaraldehyde, adipaldehyde, o-phthaldehyde, m-phthaldehyde, p-phthaldehyde, polyethylene imine, phenol/formaldehyde, glyoxlic acid, and mixtures thereof.

16. A well treatment fluid comprising:
    (i) a first composition comprising hydrolyzed polyacrylamide;
    (ii) a second composition comprising one or more crosslinkers, the one or more crosslinkers comprising glyoxal; and
    (iii) a breaker consisting of one or more water-soluble iron-containing compounds comprising $FeSO_4$, and one or more booster compounds comprising ethylenediaminetetraacetic acid (EDTA) or salts of EDTA.

17. The well treatment fluid of claim 16, wherein the one or more booster compounds comprises a sodium salt of EDTA.

* * * * *